United States Patent

[11] 3,609,556

[72] Inventors William Douglas Benson
Sutton, Surrey;
John Stuart Malcolm, West Norwood,
London, both of England

[21] Appl. No. 727,273

[22] Filed May 7, 1968

[45] Patented Sept. 28, 1971

[73] Assignee U.S. Phillips Corporation
New York, N.Y.

[32] Priority May 9, 1967

[33] Great Britain

[31] 21,421/67

[54] FIXED BIAS SUPPLY ARRANGEMENT FOR LONG TAILED PAIR TRANSISTOR CONFIGURATION
5 Claims, 2 Drawing Figs.

[52] U.S. Cl. .......... 325/430, 330/30

[51] Int. Cl. .......... H04b 1/28

[50] Field of Search .......... 330/22, 40, 30 D; 325/430

[56] References Cited

UNITED STATES PATENTS 3,040,264 6/1962 Weidner .......... 330/22

3,076,150 1/1963 Rozner .......... 330/40

OTHER REFERENCES

Handbook of Electronic Circuits Ed. by R. Feinberg page 84, FIG. 1

*Primary Examiner*—Robert L. Griffin
*Assistant Examiner*—Anthony H. Handal
*Attorney*—Frank R. Trifari

ABSTRACT: A circuit arrangement comprising a DC coupled amplifier and at least a preceding stage incorporating a pair of transistors, the bias for an electrode of each transistor of said preceding stage being derived from said DC coupled amplifier, each being determined by a multiple being on integer of the bias-emitter junction potential of transistors incorporated in said DC amplifier.

INVENTORS

Figure 1:
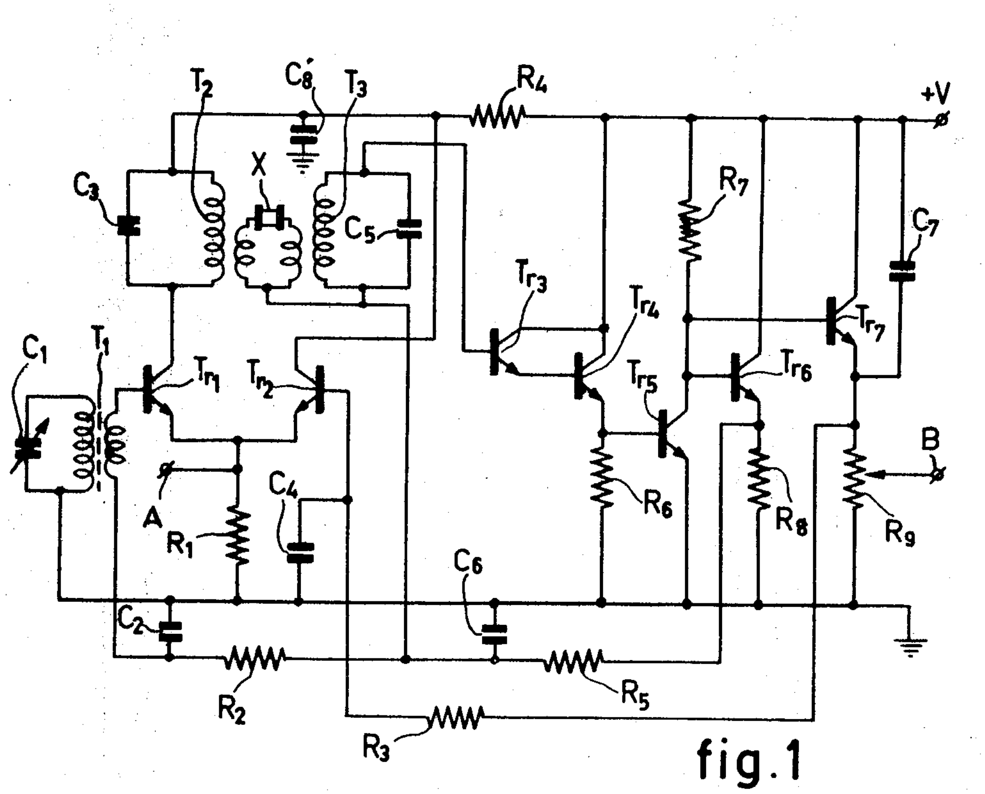

WILLIAM D. BENSON
JOHN S. MALCOLM

BY [signature]

AGENT

FIXED BIAS SUPPLY ARRANGEMENT FOR LONG TAILED PAIR TRANSISTOR CONFIGURATION

The present invention relates to circuit arrangements incorporating transistors, and especially to such arrangements where internal provision is made for biasing early stages.

Normal methods of providing bias for transistor circuits has been either to bias from a resistor connected between the collector electrode of a transistor and its base, or to connect a potential divider between the supply lines for the circuit and to derive the bias from some point on the potential divider. However, with both these arrangements any alterations in the supply voltage will provide a change in the bias potential which in many cases may be detrimental to circuit operation.

It is an object of the present invention to provide a circuit arrangement in which the bias to an early stage may remain substantially constant with changes in the circuit supply voltage.

The present invention is a circuit arrangement comprising a DC coupled amplifier and at least a preceding stage incorporating a pair of transistors, the bias for an electrode of each transistor of said preceding stage being derived from said DC coupled amplifier, each being determined by a multiple being an integer of the base-emitter junction potential of transistors incorporated in said DC amplifier.

In one arrangement the DC amplifier provides two bias potentials of the same level but derived from different portions of the amplifier circuit, the potentials being employed to bias a pair of transistors coupled as a long-tailed-pair. If the DC amplifier circuit is provided to amplify the intermediate frequency in a radio receiver, the long-tailed-pair may serve as a mixer circuit to mix an incoming RF signal with oscillations produced in a local oscillator. One of the bias potentials may also carry a varying DC signal proportional to the signal strength of the IF signal and this may provide AGC for the mixer circuit.

The bias potentials may alternatively be of different level, the variation between them being the base-emitter potential of one transistor which bias potentials may be applied to early stages requiring different bias levels.

Figure 2:
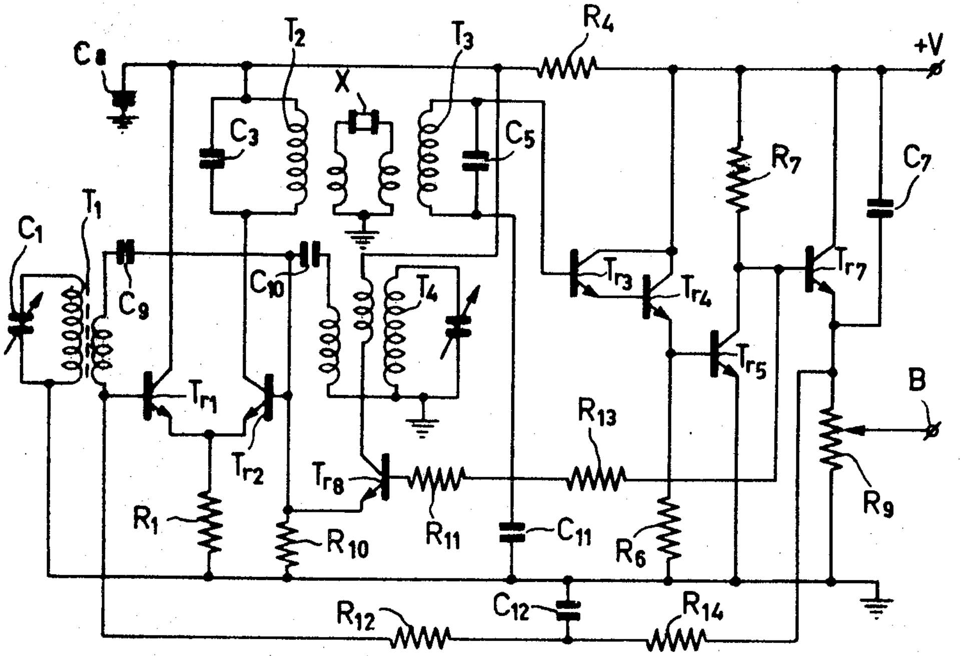

The above and other features of the present invention will be more readily understood by a perusal of the following description having reference to the drawing in which:

FIG. 1 is a circuit diagram of the mixer and IF stages of a radio receiver employing the present invention, and FIG. 2 is a modification of the circuit of FIG. 1.

Referring to FIG. 1, the aerial coil of a radio receiver is formed by the primary winding of a transformer T1, which is normally wound on a ferrite rod to form the aerial for the receiver, this coil being tuned by a variable capacitor C1. RF signals from the aerial circuit are passed by way of the secondary winding of the transformer T1 to the base electrode of a transistor Tr1 which, together with a second transistor Tr2 form a long-tailed-pair mixing circuit.

The emitter electrodes of transistors Tr1 and Tr2 are connected together and a common emitter resistor R1 connected between the common connection and ground. The collector electrode of transistor Tr1 is connected to the positive supply line +V through the primary winding of a transformer T2 and a resistor R4, the connection between the transformer T2 and resistor R4 being decoupled by means of a capacitor C8. The transformer T2 together with a capacitor C3, piezoceramic element X, transformer T3 and a capacitor C5 form a triple tuned bandpass filter tuned to the intermediate frequency for the receiver, the output from the filter being applied to the bass electrode of a transistor Tr3 which is in Darlington connection with a further transistor Tr4.

The transistor Tr4 is connected in common collector configuration having an emitter resistor connected between its emitter electrode and ground, the emitter electrode being directly connected to the base electrode of a further transistor Tr5 connected in common emitter configuration. The collector electrode of transistor Tr5 is connected to the positive supply line +V through a resistor R7, the collector electrode also being connected to the base electrodes of two further transistors Tr6 and Tr7 both of which are connected in common collector configuration. The emitter electrode of transistor Tr6 is connected to ground through a resistor R8 and also to a pair of resistors R5 and R2 provided in series. The junction between resistors R2 and R5 is connected to the grounded end of the bandpass filter circuit, this point being decoupled to RF by a capacitor C6, while the terminal of resistor R2 remote from resistor R5 is connected to the grounded end of the secondary winding of transformer T1, this junction being decoupled to RF by a capacitor C2. The emitter electrode of the other common collector transistor Tr7 is connected to ground through a potentiometer R9 from the wiper of which the audio content of the IF signal is derived through terminal B, transistor Tr7 acting as a detector by virtue of the capacitor C7 connected between the positive supply line +V and its emitter electrode. The emitter electrode of transistor Tr7 is also connected through a resistor R3 to the base electrode of transistor Tr2, this latter electrode being decoupled to ground by a capacitor C4.

In operation RF signals from the aerial tuned circuit are applied to the base electrode of transistor Tr1, to the emitter electrode of this transistor and transistor Tr2 is applied the local oscillator signal through terminal A. The two signals are mixed in the long-tailed-pair and the difference which forms the intermediate frequency is derived from the collector circuit of transistor Tr1 through the triple tuned bandpass circuit. The IF signal is amplified by the DC amplifying stages and the detected output derived from terminal B.

For normal bias conditions it is required that transistors Tr1 and Tr2 have an equal bias applied to their base electrodes and should not vary substantially with changes in the supply line +V.

The bias for transistor Tr1 in this case is derived from the emitter electrode of transistor Tr6 which is held at three times the base emitter junction potentials for the transistors (i.e. 3Vbe) also necessary to bias transistor Tr3 due to the direct connection existing between the base-emitter junctions of transistors Tr3, Tr4, and Tr5 and ground, and the DC coupling between the base electrode of transistor Tr3 and the emitter electrode of transistor Tr6. To achieve a voltage of 3Vbe at the emitter electrode of transistor Tr6, the base electrode of this transistor is held at 4Vbe which is therefore the voltage at the collector electrode of transistor Tr5. By virtue of the connection of transistor Tr7, the emitter electrode of this transistor will also be held at 3Vbe and due to the DC connection between this electrode and the base electrode of transistor Tr2, that base electrode will also be held at a voltage equal to that at transistor Tr1. Any variation in signal strength will appear as an additional varying voltage at the emitter electrode of transistor Tr6 and passed to the base electrode of transistor Tr1 which will affect the conduction of the long-tailed-pair to provide automatic gain control.

The circuit arrangement of FIG. 2 is similar to that shown in FIG. 1 and like reference numerals between the two figures represent like circuit components. In this figure the mixer circuit is slightly different than that shown in FIG. 1 and includes an oscillator transistor Tr8 and associated circuit being provided. In the DC amplifier the transistor Tr6 has been omitted as it is required to derive two bias potentials, one of which differs from the other by Vbe. The collector electrode of transistor Tr5 is this time arranged to be at 3Vbe which is applied to the base electrodes of transistors Tr3 and Tr8.

By virtue of the direct connections between the emitter electrode of transistor Tr8 and the base electrode of transistor Tr2, the base electrode of this latter mentioned transistor will be held at 2Vbe. The emitter electrode of transistor Tr7 will now be at 2Vbe which is applied through resistors R12 and R14 to the base electrode of transistor Tr1, the common point of these two resistors being decoupled by capacitor C12. The two base electrodes of the long-tailed-pair are therefore biased at the same potential and as before one of the pair, this time transistor Tr1 has the AGC signal applied to it.

Although in the above description the circuits described have been IF amplifier circuits and the earlier stages have been mixer circuits, the invention is in no way limited thereto. The amplifying circuits may be part of such an amplifier.

What we claim is:

1. A circuit arrangement for supplying a relatively independent fixed bias supply comprising a first stage having first and second transistors, each of said transistors having base-emitter and collector electrodes, the emitter electrodes of each transistor commonly connected, a second stage having an input connected to the output of said first stage, said second stage including a plurality of series connected transistor junctions forming DC amplifier for signals from said first stage, first means for deriving a fixed multiple of the junction bias signal from a first point coupled to a junction of one of said second stage transistors, second means for deriving said fixed multiple signal from a second point coupled to a junction of another of said second stage transistors, said first and second means coupling said fixed multiple of the junction bias signal to each of said first stage transistor base electrodes for providing a fixed bias supply to said first stage transistor, thereby rendering said first stage transistors base biasing relatively independent of supply voltage.

2. A circuit arrangement for supplying a relatively independent fixed bias supply comprising a first stage having first and second transistors, each of said transistors having base, emitter and collector electrodes, the emitter electrodes of each transistor commonly connected, a second stage having an input connected to the output of said first stage, said second stage including a first plurality of forward biased transistor base-emitter junctions connected in series relationship to a first point and a second plurality of forward biased transistor base-emitter junctions connected in series to a second point, said second stage forming a DC amplifier for signals from said first stage, first means for deriving a fixed multiple of the junction bias signal from said first point coupled to a junction of one of said second stage transistors second means for deriving a fixed multiple signal from said second point coupled to a junction of another of said second stage transistors, said first and second means coupling said fixed multiple of the junction bias signal to each of said first stage transistor base electrodes for providing a fixed bias supply to said first stage transistors, thereby rendering said first stage transistors base biasing relatively independent of supply voltage.

3. A circuit arrangement as claimed in claim 1 for the amplification of a modulated carrier wave, wherein at least one transistor junction of the DC coupled transistor amplifier is connected as a signal detector for a modulated carrier wave introduced to said preceding stage and the forward junction potential of said one transistor junction of the DC coupled amplifier determines the base bias supply of only one of said first stage transistors.

4. A circuit arrangement as claimed in claim 1 wherein the said pair of transistors are coupled as a long-tailed-pair and operate as a mixing stage, one of the transistors of said DC coupled transistor amplifier being connected as a local oscillator, the oscillation of said local oscillator and base bias supply for one of the transistors coupled as a long-tailed-pair being derived from the emitter electrode of said transistor connected as a local oscillator.

5. The combination of claim 2 wherein the said pair of first stage transistors are coupled as a long-tailed-pair and operate as a mixing stage, one of the transistors of said DC coupled transistor amplifier being connected as a local oscillator, the oscillation of said local oscillator and the base bias supply for one of the transistors coupled as a long-tailed-pair being derived from the emitter electrode of said transistor connected as a local oscillator.